United States Patent

Horley et al.

(10) Patent No.: US 10,140,476 B2
(45) Date of Patent: Nov. 27, 2018

(54) TRACING PROCESSING ACTIVITY

(71) Applicant: ARM LIMITED, Cambridge (GB)

(72) Inventors: John Michael Horley, Hauxton (GB); Michael John Williams, Ely (GB); Simon John Craske, Cambridge (GB); Uma Maheswari Ramalingam, Bangalore (IN)

(73) Assignee: ARM Limited, Cambridge (GB)

( * ) Notice: Subject to any disclaimer, the term of this patent is extended or adjusted under 35 U.S.C. 154(b) by 85 days.

(21) Appl. No.: 15/189,284

(22) Filed: Jun. 22, 2016

(65) Prior Publication Data

US 2016/0371501 A1 Dec. 22, 2016

(30) Foreign Application Priority Data

Jun. 22, 2015 (GB) .................................. 1510958.0

(51) Int. Cl.
*G06F 21/74* (2013.01)
(52) U.S. Cl.
CPC .................................... *G06F 21/74* (2013.01)
(58) Field of Classification Search
None
See application file for complete search history.

(56) References Cited

U.S. PATENT DOCUMENTS 5,970,246 A * 10/1999 Moughani ........... G06F 11/3636
711/1
8,966,323 B2 * 2/2015 Horley .................. G06F 11/348
714/45

(Continued)

FOREIGN PATENT DOCUMENTS

EP 1 612 638 1/2006
WO WO 2012/137321 10/2012

OTHER PUBLICATIONS

Combined Search and Examination Report for GB1510958.0 dated Jan. 18, 2016, 6 pages.

*Primary Examiner* — Kaveh Abrishamkar
(74) *Attorney, Agent, or Firm* — Nixon & Vanderhye P.C.

(57) ABSTRACT

A data processing apparatus comprises a processing element having associated memory storage and one or more registers, the processing element being configured to perform processing activities in two or more security modes so as to inhibit a processing activity performed in one of the security modes from accessing at least some information associated with a processing activity performed in another of the security modes; in which the processing element is configured, in response to a function call causing a branch from a processing activity in a first security mode to a processing activity in a second security mode, to store the contents of one or more of the registers in the memory storage and, in response to a branch return to the first security mode, to retrieve the register contents from the memory storage; and trace apparatus configured to generate items of trace data indicative of processing activities of the processing element; in which the trace apparatus is configured to detect a branch return operation by the processing element and to generate one or more items of trace data relating to the branch return operation; and in which the trace apparatus is configured to detect the processing element retrieving register contents from the memory storage in response to a branch return to the first security mode and to generate one or more further items of trace data relating to the retrieval of the register contents from the memory storage.

13 Claims, 4 Drawing Sheets

(56) References Cited

U.S. PATENT DOCUMENTS

| | | | |
|---|---|---|---|
| 9,251,384 B1* | 2/2016 | Potlapally | G06F 21/85 |
| 2004/0153672 A1 | 8/2004 | Watt et al. | |
| 2011/0185007 A1* | 7/2011 | Sugawara | G06F 9/4856 |
| | | | 709/201 |
| 2012/0166887 A1* | 6/2012 | Horley | G06F 11/348 |
| | | | 714/45 |
| 2017/0168820 A1* | 6/2017 | Eyole | G06F 9/30036 |

* cited by examiner

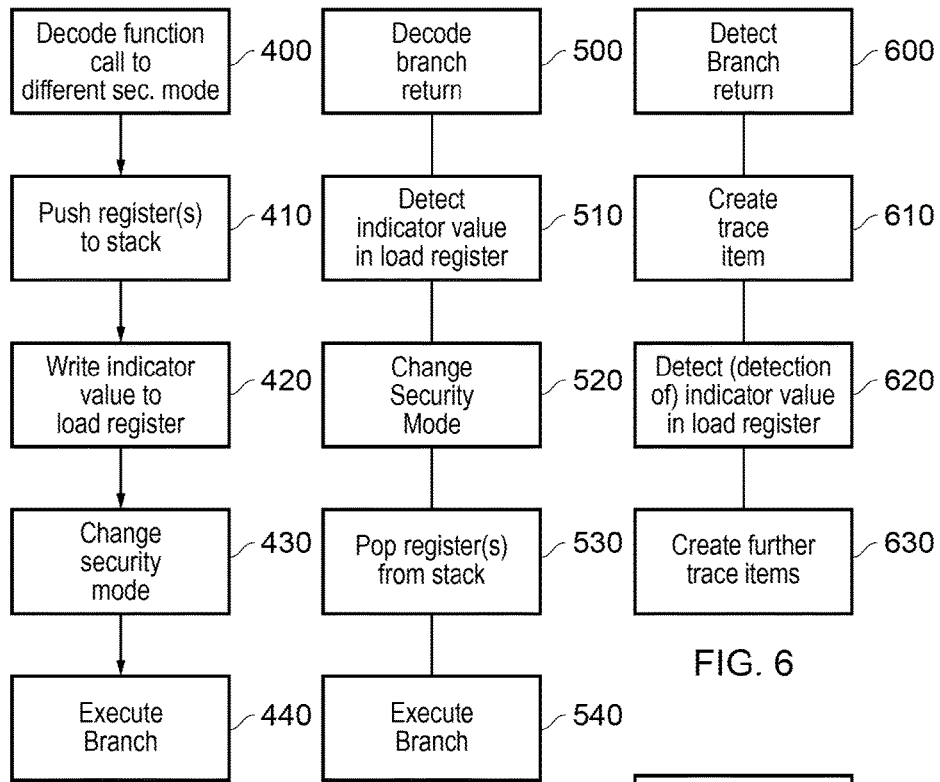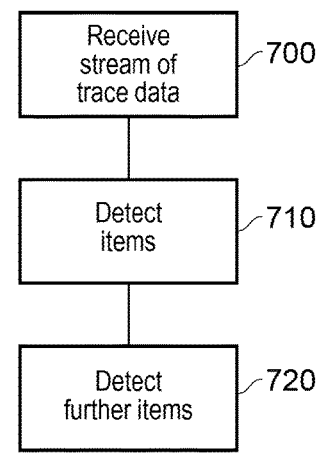

TRACING PROCESSING ACTIVITY

This application claims priority to GB Patent Application No. 1510958.0 filed 22 Jun. 2015, the entire content of which is hereby incorporated by reference.

BACKGROUND

This disclosure relates to tracing processing activity.

There are a number of occasions where it is desirable to keep track of the processing activities being performed by a processing element such as a central processing unit (CPU). For example, such information is useful during the development of data processing apparatus. An example of a tool that may be used to assist in such a process is a tracing tool.

Tracing the activity of a processing element whereby a trace stream is generated that includes data representing the step-by-step activity within the system is a highly useful tool in system development. Such tracing tools use a variety of means for tracing the program flow including embedded trace macrocells (ETM, a trademark of ARM Limited, Cambridge) which are present on the chip whose processing is being monitored.

These tracing tools can be used to reconstruct the state of a machine at a certain point during execution of the instruction stream and in order to do this may require knowledge of data transfers to registers if the contents of the registers are to be reconstructed or may require knowledge of data transfers to particular addresses if the memory state is to be reconstructed.

Some processing elements can perform processing activities in two or more security modes so as to inhibit a processing activity performed in one of the security modes from accessing at least some information associated with a processing activity performed in another of the security modes. A temporary change in security mode may be required as part of the operational activity of the processing element, for example to call a function or subroutine in one security mode from code running in another security mode.

SUMMARY

In an example arrangement there is provided a data processing apparatus comprising:

a processing element having associated memory storage and one or more registers, the processing element being configured to perform processing activities in two or more security modes so as to inhibit a processing activity performed in one of the security modes from accessing at least some information associated with a processing activity performed in another of the security modes;

in which the processing element is configured, in response to a function call causing a branch from a processing activity in a first security mode to a processing activity in a second security mode, to store the contents of one or more of the registers in the memory storage and, in response to a branch return to the first security mode, to retrieve the register contents from the memory storage; and trace apparatus configured to generate items of trace data indicative of processing activities of the processing element;

in which the trace apparatus is configured to detect a branch return operation by the processing element and to generate one or more items of trace data relating to the branch return operation; and in which the trace apparatus is configured to detect the processing element retrieving register contents from the memory storage in response to a branch return to the first security mode and to generate one or more further items of trace data relating to the retrieval of the register contents from the memory storage.

In another example arrangement there is provided a trace apparatus comprising:

trace circuitry configured to generate items of trace data indicative of processing activities of a processing element having an associated memory storage and one or more registers, the processing element being configured to perform processing activities in two or more security modes so as to inhibit a processing activity performed in one of the security modes from accessing at least some information associated with a processing activity performed in another of the security modes, and the processing element being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

in which the trace circuitry is configured to detect a branch return operation by the processing element and to generate one or more items of trace data relating to the branch operation; and in which the trace circuitry is configured to detect the processing element retrieving register contents from the memory storage in response to a branch return to the first security mode and to generate one or more further items of trace data relating to the retrieval of the register contents from the memory storage.

In another example arrangement there is provided a diagnostic apparatus comprising:

an input for receiving a stream of trace data from a data processing apparatus having a processing element having an associated memory storage and one or more registers, the processing element being configured to perform processing activities in two or more security modes so as to inhibit a processing activity performed in one of the security modes from accessing at least some information associated with a processing activity performed in another of the security modes; the diagnostic apparatus comprising:

a detector configured to detect one or more items of trace data indicative of a branch return operation by the processing element; and a detector configured to detect one or more further items of trace data indicative of the processing element retrieving register contents from the memory storage in response to a branch return from a second security mode to a first security mode.

In another example arrangement there is provided a data processing apparatus comprising:

means for processing, having associated means for storing data and one or more registers, the means for processing being operable to perform processing activities in two or more security modes so as to inhibit a processing activity performed in one of the security modes from accessing at least some information associated with a processing activity performed in another of the security modes;

in which the means for processing is configured, in response to a function call causing a branch from a processing activity in a first security mode to a processing activity in a second security mode, to store the contents of one or more of the registers in the memory storage and, in response to a branch return to the first security mode, to retrieve the register contents from the memory storage; and means for generating items of trace data indicative of processing activities of the means for processing;

in which the means for generating is configured to detect a branch return operation by the means for processing and to generate one or more items of trace data relating to the branch return operation; and in which the means for generating is configured to detect the means for processing retrieving register contents from the memory storage in response to a branch return to the first security mode and to generate one or more further items of trace data relating to the retrieval of the register contents from the memory storage.

In another example arrangement there is provided a trace apparatus comprising:

means for generating items of trace data indicative of processing activities of a means for processing having an associated memory storage and one or more registers, the means for processing being configured to perform processing activities in two or more security modes so as to inhibit a processing activity performed in one of the security modes from accessing at least some information associated with a processing activity performed in another of the security modes, and the means for processing being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

in which the means for generating is configured to detect a branch return operation by the processing element and to generate one or more items of trace data relating to the branch operation; and in which the means for generating is configured to detect the means for processing retrieving register contents from the memory storage in response to a branch return to the first security mode and to generate one or more further items of trace data relating to the retrieval of the register contents from the memory storage.

In another example arrangement there is provided a diagnostic apparatus comprising:

means for receiving a stream of trace data from a data processing apparatus having a processing element having an associated memory storage and one or more registers, the processing element being configured to perform processing activities in two or more security modes so as to inhibit a processing activity performed in one of the security modes from accessing at least some information associated with a processing activity performed in another of the security modes;

means for detecting one or more items of trace data indicative of a branch return operation by the processing element; and means for detecting one or more further items of trace data indicative of the processing element retrieving register contents from the memory storage in response to a branch return from a second security mode to a first security mode.

In another example arrangement there is provided a trace method comprising:

generating items of trace data indicative of processing activities of a processing element having an associated memory storage and one or more registers, the processing element being configured to perform processing activities in two or more security modes so as to inhibit a processing activity performed in one of the security modes from accessing at least some information associated with a processing activity performed in another of the security modes, and the processing element being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

detecting a branch return operation by the processing element;

generating one or more items of trace data relating to the branch operation;

detecting the processing element retrieving register contents from the memory storage in response to a branch return to the first security mode; and generating one or more further items of trace data relating to the retrieval of the register contents from the memory storage.

In another example arrangement there is provided a diagnostic method comprising:

receiving a stream of trace data from a data processing apparatus having a processing element having an associated memory storage and one or more registers, the processing element being configured to perform processing activities in two or more security modes so as to inhibit a processing activity performed in one of the security modes from accessing at least some information associated with a processing activity performed in another of the security modes;

detecting one or more items of trace data indicative of a branch return operation by the processing element; and detecting one or more further items of trace data indicative of the processing element retrieving register contents from the memory storage in response to a branch return from a second security mode to a first security mode.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 4 is a schematic flowchart illustrating a function call process;

FIG. 5 is a schematic flowchart illustrating a branch return process;

FIG. 6 is a schematic flowchart illustrating a trace item creation process;

FIG. 8 is a schematic flowchart illustrating a diagnostic process.

DESCRIPTION OF EMBODIMENTS

Figure 1:
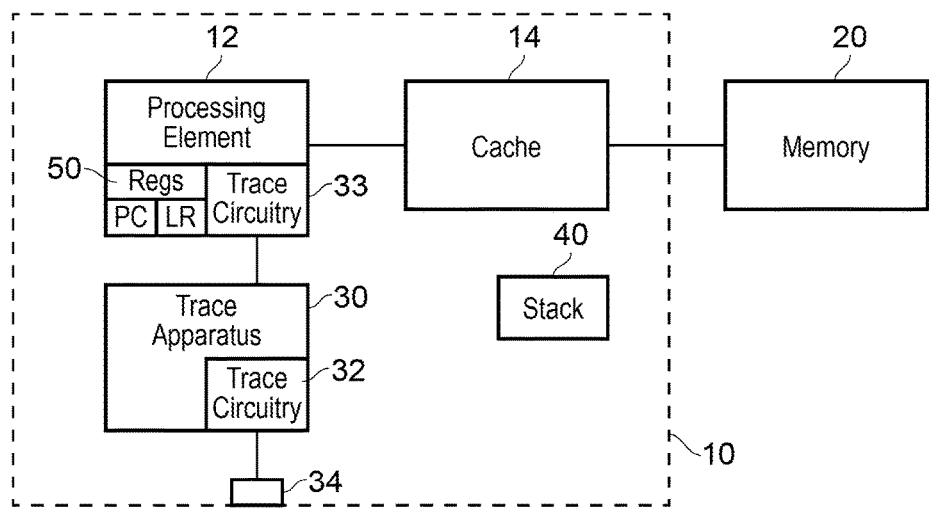
FIG. 1 schematically illustrates a data processing apparatus.

Before discussing the embodiments with reference to the accompanying figures, the following description of embodiments is provided.

An example embodiment provides a data processing apparatus comprising:

a processing element having associated memory storage and one or more registers, the processing element being configured to perform processing activities in two or more security modes so as to inhibit a processing activity performed in one of the security modes from accessing at least some information associated with a processing activity performed in another of the security modes;

in which the processing element is configured, in response to a function call causing a branch from a processing activity in a first security mode to a processing activity in a second security mode, to store the contents of one or more of the registers in the memory storage and, in response to a branch return to the first security mode, to retrieve the register contents from the memory storage; and trace apparatus configured to generate items of trace data indicative of processing activities of the processing element;

in which the trace apparatus is configured to detect a branch return operation by the processing element and to generate one or more items of trace data relating to the branch return operation; and in which the trace apparatus is configured to detect the processing element retrieving register contents from the memory storage in response to a branch return to the first security mode and to generate one or more further items of trace data relating to the retrieval of the register contents from the memory storage.

Example embodiments of the present disclosure recognise that in the event of a temporary change in security mode, for example at a branch to a function or subroutine under a different security mode, in order to allow registers associated with the processing element to be used in the second (new) security mode without disclosing the content of those registers used by the first (original) security mode, it can be appropriate to store those registers in memory storage such as a processing element stack.

When the processing element returns from the function or subroutine call, which is to say, it returns to the first security mode, the register contents are retrieved from the memory storage. This also allows the processing activity in the first security mode to resume with the same register parameters that applied when the branch to the function or subroutine took place.

However, the trace apparatus cannot necessarily detect from the program code alone whether or not such a retrieval operation (of the register contents from the memory storage) will take place as a result of the branch return operation.

Accordingly, in example embodiments, the trace apparatus generates one or more further items of trace data relating to a retrieval from memory storage, if it detects that such a retrieval operation is taking place.

Although the security modes could be considered complementary, so that code executing under either security mode cannot access at least some information associated with the other security mode, in example embodiments the first security mode represents a higher level of security than the second security mode, such that a processing activity performed in a lower security mode cannot access at least some information associated with a processing activity performed in a higher security mode.

In example embodiments, the items of trace data comprise instruction items and data items having respective keys linking an instruction item with a related data item. This can allow a link to be detected, for example as part of a subsequent analysis or diagnostic process, between an instruction and the data which is handled as a result of that instruction item, even if there is potentially a delay before the data is available.

In example embodiments, the one or more further items of trace data relating to the retrieval of the register contents from the memory storage comprise an instruction item indicating a memory storage retrieval operation in response to a branch return to the first security mode, and/or one or more data items, the one or more data items indicating register contents retrieved from the memory storage. To allow a link to be detected (for example, by a later diagnostic or analysis arrangement), in example embodiments the one or more data items of the further items of trace data comprise a key linking the one or more data items to the instruction item of the further items of trace data. As an example of a data format, the one or more data items may comprise: one or more data address items each indicative of an address from which data is retrieved from the memory storage; one or more respective data value items each indicative of data retrieved from the memory storage; and key information linking data address items to corresponding data value items.

As an example of a convenient way of detecting that a branch return or similar operation relates to a change back to the first security mode, in example embodiments the processing element comprises: a program counter register indicating an address of a next instruction for execution; a link register configured, in response to a function call other than a function call from the first security mode to the second security mode, to store a current program counter value so that the stored value can be written back to the program counter at a branch return; control logic configured to detect that a function call is from the first security mode to the second security mode and, in response to such a detection, to store the current program counter value in the memory storage and to write an indicator value to the link register; and a detector configured to detect, at a branch return operation, that the link register contains the indicator value and, in response to such a detection, to cause the processing element to retrieve the program counter value from the memory storage.

The presence of the indicator value can also conveniently be used, in a system in which other register values were placed into the memory storage, to prompt the retrieval of those other register contents. In example embodiments, the control logic is configured to store the contents of one or more further registers in the memory storage in response to a detection that a function call is from the first security mode to the second security mode; and the detector is configured, in response to a detection that the link register contains the indicator value, to cause the processing element to retrieve the one or more further registers from the memory storage.

As well as providing an overall indication that a branch return involves a security mode change and/or that one or more registers need to be retrieved from memory storage, the indicator value can also provide further information. In example embodiments the control logic is configured to a write an indicator value to the link register selected from two or more possible indicator values, each indicator value indicating the storage, in the memory storage, of a different respective set of registers; and the detector is configured to cause the processing element to retrieve, from the memory storage, the set of registers indicated by the indicator value.

Various types of memory storage may be used, but in example embodiments the processing element is a central processing unit (CPU); and the memory storage is a CPU stack.

Another example embodiment provides a trace apparatus comprising:

trace circuitry configured to generate items of trace data indicative of processing activities of a processing element having an associated memory storage and one or more registers, the processing element being configured to perform processing activities in two or more security modes so as to inhibit a processing activity performed in one of the security modes from accessing at least some information associated with a processing activity performed in another of the security modes, and the processing element being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

in which the trace circuitry is configured to detect a branch return operation by the processing element and to generate one or more items of trace data relating to the branch operation; and in which the trace circuitry is configured to detect the processing element retrieving register contents from the memory storage in response to a branch return to the first security mode and to generate one or more further items of trace data relating to the retrieval of the register contents from the memory storage.

Another example embodiment provides a diagnostic apparatus comprising:

an input for receiving a stream of trace data from a data processing apparatus having a processing element having an associated memory storage and one or more registers, the processing element being configured to perform processing activities in two or more security modes so as to inhibit a processing activity performed in one of the security modes from accessing at least some information associated with a processing activity performed in another of the security modes; the diagnostic apparatus comprising:

a detector configured to detect one or more items of trace data indicative of a branch return operation by the processing element; and a detector configured to detect one or more further items of trace data indicative of the processing element retrieving register contents from the memory storage in response to a branch return from a second security mode to a first security mode.

Another example embodiment provides a data processing apparatus comprising:

means for processing, having associated means for storing data and one or more registers, the means for processing being operable to perform processing activities in two or more security modes so as to inhibit a processing activity performed in one of the security modes from accessing at least some information associated with a processing activity performed in another of the security modes;

in which the means for processing is configured, in response to a function call causing a branch from a processing activity in a first security mode to a processing activity in a second security mode, to store the contents of one or more of the registers in the memory storage and, in response to a branch return to the first security mode, to retrieve the register contents from the memory storage; and means for generating items of trace data indicative of processing activities of the means for processing;

in which the means for generating is configured to detect a branch return operation by the means for processing and to generate one or more items of trace data relating to the branch return operation; and in which the means for generating is configured to detect the means for processing retrieving register contents from the memory storage in response to a branch return to the first security mode and to generate one or more further items of trace data relating to the retrieval of the register contents from the memory storage.

Another example embodiment provides a trace apparatus comprising:

means for generating items of trace data indicative of processing activities of a means for processing having an associated memory storage and one or more registers, the means for processing being configured to perform processing activities in two or more security modes so as to inhibit a processing activity performed in one of the security modes from accessing at least some information associated with a processing activity performed in another of the security modes, and the means for processing being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

in which the means for generating is configured to detect a branch return operation by the processing element and to generate one or more items of trace data relating to the branch operation; and in which the means for generating is configured to detect the means for processing retrieving register contents from the memory storage in response to a branch return to the first security mode and to generate one or more further items of trace data relating to the retrieval of the register contents from the memory storage.

Another example embodiment provides a diagnostic apparatus comprising:

means for receiving a stream of trace data from a data processing apparatus having a processing element having an associated memory storage and one or more registers, the processing element being configured to perform processing activities in two or more security modes so as to inhibit a processing activity performed in one of the security modes from accessing at least some information associated with a processing activity performed in another of the security modes;

means for detecting one or more items of trace data indicative of a branch return operation by the processing element; and means for detecting one or more further items of trace data indicative of the processing element retrieving register contents from the memory storage in response to a branch return from a second security mode to a first security mode.

Another example embodiment provides a trace method comprising:

generating items of trace data indicative of processing activities of a processing element having an associated memory storage and one or more registers, the processing element being configured to perform processing activities in two or more security modes so as to inhibit a processing activity performed in one of the security modes from accessing at least some information associated with a processing activity performed in another of the security modes, and the processing element being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

detecting a branch return operation by the processing element;

generating one or more items of trace data relating to the branch operation;

detecting the processing element retrieving register contents from the memory storage in response to a branch return to the first security mode; and generating one or more further items of trace data relating to the retrieval of the register contents from the memory storage.

Another example embodiment provides a diagnostic method comprising:

receiving a stream of trace data from a data processing apparatus having a processing element having an associated memory storage and one or more registers, the processing element being configured to perform processing activities in two or more security modes so as to inhibit a processing activity performed in one of the security modes from accessing at least some information associated with a processing activity performed in another of the security modes;

detecting one or more items of trace data indicative of a branch return operation by the processing element; and detecting one or more further items of trace data indicative of the processing element retrieving register contents from the memory storage in response to a branch return from a second security mode to a first security mode.

Referring now to the drawings, FIG. 1 schematically illustrates a data processing apparatus 10 connected to a memory 20. The data processing apparatus 10 comprises a processing element (such as a central processing unit or CPU) 12 which can access a cache 14 and/or the memory 20, and a trace apparatus in the form of an embedded trace macrocell (ETM) 30. There is trace circuitry 32 within the ETM 30 and also trace circuitry 33 within the processing element 12, both of which may be considered as parts of the trace apparatus. The trace circuitry 32 and the trace circuitry 33 cooperate to carry out the functions of the trace apparatus. The trace apparatus is configured to generate items of trace data indicative of processing activities of the processing element, which in one specific example to be discussed below may involve detecting a branch return operation by the processing element and to generate one or more items of trace data relating to the branch return operation.

The processing element 12 executes a stream of instructions. In doing so it can access a processing element stack 40 and one or more registers 50 (provided, in this example, as a part of the processing element) which may include, for example, a program counter (PC) and a link register (LR) to be discussed below. The processing element stack is an area of memory storage which can be provided (for example) within the processing element, on the same substrate as the processing element, in the memory 20 or the like. Its general function is to act as memory storage to which the processing element can push (or store) one or more data items, and subsequently pop (or retrieve) those memory items. Some examples of a processing element stack have a first-in-last-out structure so that a most recently pushed item or group of items forms a first item or group of items to be retrieved at a stack pop operation. But although this first-in-last-out structure provides operational convenience, it is not essential to the operation of the memory storage in the present embodiments.

The stack 40 may in fact be implemented as a respective stack for each security mode (a point which will be discussed below with reference to FIG. 3).

The registers provide storage, associated with the processing element, for one or more (typically, several) data items specific to the processing element. These can include control data items such as a program counter (PC) indicating a next instruction to be handled, and a link register (LR) used to indicate an address to return after a branch to a subroutine or function, along with registers for storing processing element variables with no separate architectural significance but which are used as part of the execution of instructions by the processing element, such as so-called r0-r12 registers and a floating point (FP) register.

The processing element 12 has some trace circuitry 33 within it or associated with it, which is configured to identify certain types of instructions that are being executed and/or to identify certain processing activities and, in some cases, to associate key values with instructions and the data to which the instructions are applied. The use of instruction items and data items having respective keys linking an instruction item with a related data item allows the trace apparatus to associate the execution of instructions with the results of the execution of those instructions.

The trace apparatus also comprises trace circuitry 32 that can query the processing element 12 when a so-called "trace enable" is on or activated, and can receive in response to the query, information regarding the execution of the stream of instructions and where these are provided, the associated key values.

From this information the trace apparatus generates items of trace data (or trace elements) and these are output via a trace data output 34. The items of trace data can take a number of forms, and some specific examples of items of trace data will be discussed below.

Figure 2:
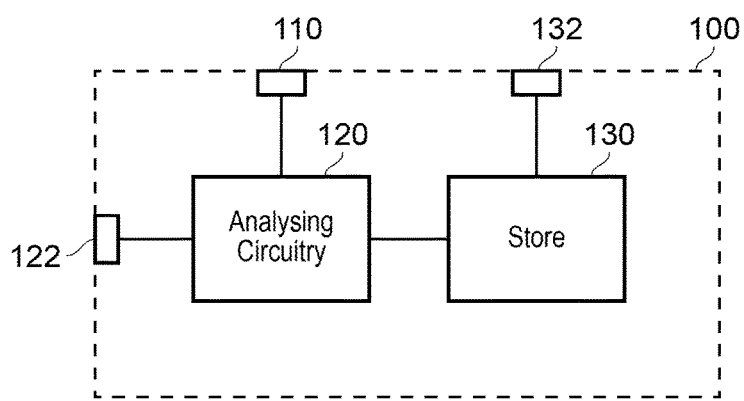
FIG. 2 schematically illustrates an analysing or diagnostic apparatus.

FIG. 2 schematically illustrates an analysing or diagnostic apparatus 100 for receiving the items of trace data from data processing apparatus 10 of FIG. 1 and for analysing them. The analysing apparatus 100 has an input 110 for receiving a stream of trace data from the data processing apparatus 10 and analysing circuitry 120 which acts to analyse the items of trace data to deduce information about processing activities of the processing element. In some examples, the analysing circuitry 120 makes use of information about which instructions in the instruction stream are currently being executed by the processing element so that it can relate the trace data elements received to the corresponding instructions. To hold such information, a data store 130 is provided, which stores a program image so that the analysing circuitry 120 can determine from this program image the instruction to which particular trace elements relate. An input/output port 132 is provided to the data store 130, and an input/output port 122 is provided to the analysing circuitry 120. In other example embodiments, rather than storing the instructions, the analysing apparatus can query the processing element in real time to establish what instruction the processing element is executing or has just executed at a time of relevance to the trace data.

The apparatus of FIG. 2 provides an example of a diagnostic apparatus comprising an input (such as the input 110) for receiving a stream of trace data from a data processing apparatus having a processing element having an associated memory storage and one or more registers, the processing element being configured to perform processing activities in two or more security modes so as to inhibit a processing activity performed in one of the security modes from accessing at least some information associated with a processing activity performed in another of the security modes; the diagnostic apparatus comprising: a detector (for example, implemented by the circuitry 120) configured to detect one or more items of trace data indicative of a branch return operation by the processing element; and a detector (for example, implemented by the circuitry 120) configured to detect one or more further items of trace data indicative of the processing element retrieving register contents from the memory storage in response to a branch return from a second security mode to a first security mode.

The processing element 12 is configured to perform processing activities in two or more security modes. The security modes can be arranged so as to inhibit a processing activity performed in one of the security modes from accessing at least some information associated with a processing activity performed in another of the security modes. For example, two or more security modes including a higher security level mode and a lower security level mode may be provided, such that operations of the processing element in a lower security level mode cannot access (or at least is inhibited from accessing) at least some information (such as register contents, or parts of the address space) associated with operations of the processing element in a higher security level mode. In other examples, two or more mutually exclusive security modes could be provided, so that when the processing element is operating in one of the two or more complementary security modes, it cannot access at least some information associated with operations in another of the two or more complementary security modes. These arrangements may be combined.

One use of different security modes of a processing element is in the context of virtualisation, in which multiple operating systems co-exist on a single processing element as so-called virtual machines, each under the control or oversight of a so-called hypervisor. Various steps can be taken to avoid inappropriate interference between the different virtual machines. For example, applications can run at a lowest security level; operating systems can run at a next higher security level, and the hypervisor can run at a still higher security level. In this way, protection can be built into the system to avoid (for example) an application running under one of the operating systems corrupting information used by an application running under another of the operating systems.

There can sometimes be a need for a temporary change in security mode, for example at a branch from program instructions running in one security mode to a function or subroutine under a different security mode. In order to allow registers associated with the processing element to be used in the second (new) security mode without necessarily disclosing or allowing corruption of the content of those registers as used by the first (original) security mode, it can be appropriate for the processing element 12 to store those registers in memory storage such as the processing element stack. This also allows the processing activity in the first security mode to resume with the same register parameters that applied when the branch to the function or subroutine took place. In such examples, the processing element is configured, in response to a function call causing a branch from a processing activity in a first security mode to a processing activity in a second security mode, to store the contents of one or more of the registers in the memory storage and, in response to a branch return to the first security mode, to retrieve the register contents from the memory storage.

Figure 3:
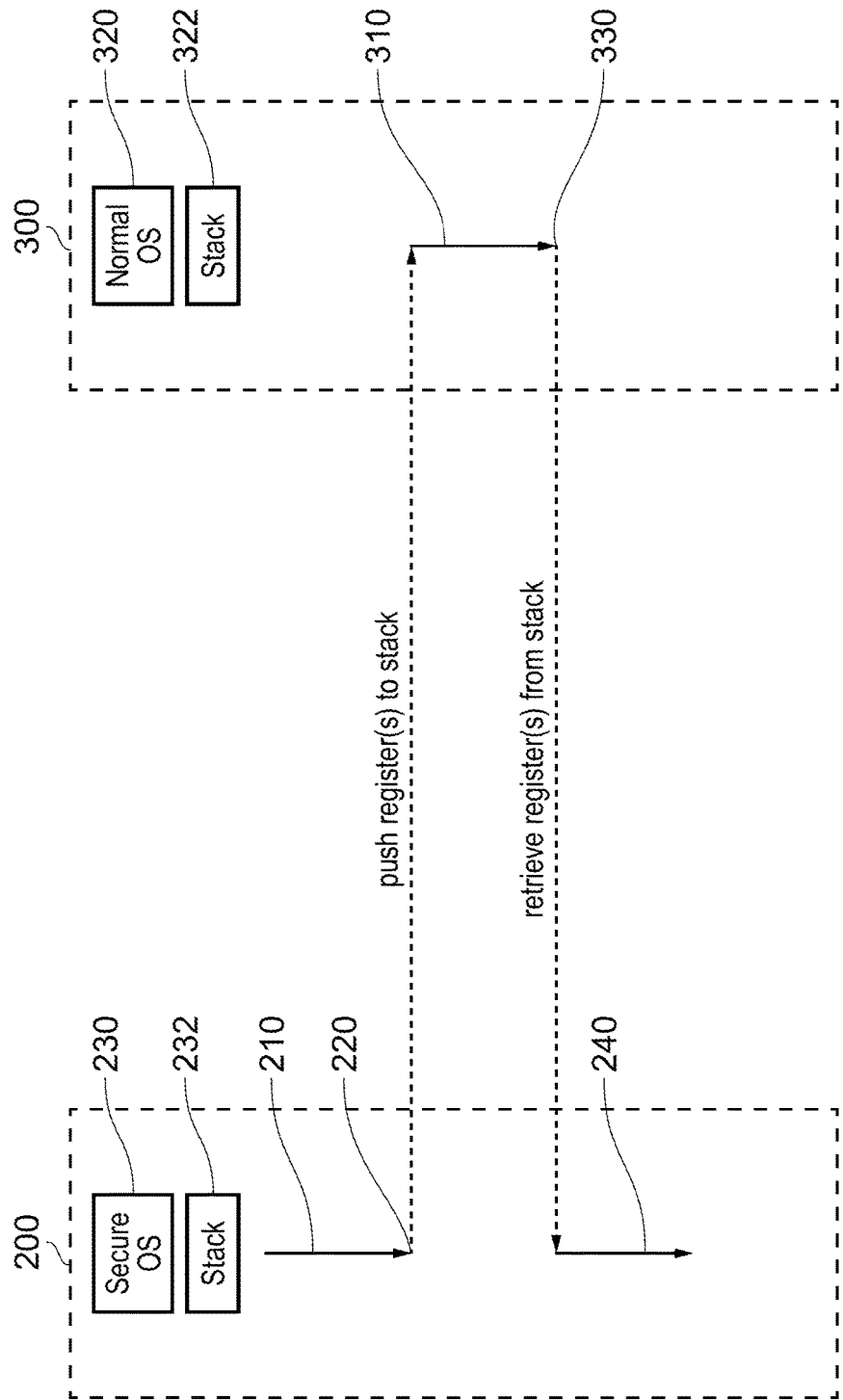
FIG. 3 schematically illustrates a change of security mode.

FIG. 3 is a schematic illustration of an example process of switching from one security mode to another, for the execution of a subroutine or function. For the purposes of this example, the processing element is initially operating in a higher security mode (operations at this security mode being indicated by a broken line box 200), and the subroutine or function is provided by program code which runs at a lower security mode (operations at this security mode being indicated by a broken line box 300). Note that FIG. 3 provides a very schematic representation of the processes at a software level; at a hardware level, it is the same processing element which is running all of the code. The processing element is just changing between security levels.

A stream of instructions (represented by a vertical arrow 210) is executed by the processing element at a first (higher, in this example) security mode under a "secure" operating system 230 and making use of a secure stack 232 as an implementation of the stack 40 for use in the first security mode. At a function call or subroutine branch instruction 220, a number of actions take place. These are detailed in a flowchart to be discussed below, but as a high level summary, the processing element is configured, in response to a function call causing a branch from a processing activity in a first security mode 200 to a processing activity in a second security mode 300, to store the contents of one or more of the registers in the memory storage (in this example, the stack 232).

The choice of which register(s) to push to the stack can depend upon the nature of the data which was stored in those registers during the execution of the stream of instructions 210 and to what extent that information is (a) secure, and (b) required again after the termination of the subroutine or function and the return to the security mode 200. Not all registers need to be pushed to the stack, and indeed in some examples only the program counter register is pushed to the stack. In other examples, one or more other registers are pushed to the stack as well (or instead). In some examples, a fixed size block of information is pushed to the stack including the contents of one or more registers.

In some examples, the amount of data pushed to the stack is variable, at least amongst a selection of different amounts, and that amount is coded (to provide an indication of the amount of data to be recovered at a corresponding stack pop operation) by one or more bits of an indicator value to be discussed below.

The link register (LR) mentioned above normally stores a return address when a function or subroutine is called. However, in the case of a function or subroutine call between security modes, a so-called indicator value is stored in the LR instead.

One function of the indicator value is to provide an indication, relevant to a subsequent branch return operation, that the contents of the LR do not represent a branch return address but that instead, the branch return address must be obtained by a stack pop operation. A single possible indicator value could be used, such that this indication is the only function of the stored indicator value. However, another potential function of the indicator value in some embodiments is to provide an indication of which register contents were stored in the stack at the original branch operation. For example, one or more least significant bits of the indicator value could indicate respective choices from a group of options such as: (a) only the PC has been stored in the stack; (b) the PC and a first predetermined set of registers (such as the PC and the interrupt program status register (IPSR) has been stored in the stack; (c) the PC and a second predetermined set of registers (such as the IPSR and one or more of r0 . . . r12 or FP) has been stored in the stack; and so on. In this way, the indicator value as stored could be selected from a plurality of possible indicator values, all of which server to provide the indication that the branch return address needs to be obtained from the stack, but each of which also indicates whether other registers or sets of registers should also be obtained from the stack.

After pushing the register(s) to the stack, control passes to the second security mode 300 and a stream of instructions (represented by an arrow 310) is executed relating to the called function in the second security mode 300. These operations are carried out under the control of a "normal" operating system 320 (where the word "normal" indicates operations under a security level lower than that of the "secure" operating system 230) and using a "normal" stack 322, as an implementation of the stack 40 for use in the second security mode.

At the end of the function call, a branch return operation 330 initiates a return to the stream of instructions 240 in the secure mode 200. The branch return operation will be discussed in more detail below, but as part of its activity, it comprises retrieving or "popping" the one or more stored registers from the stack. As discussed above, the need to retrieve the program counter (PC) and one or more other registers from the stack can be indicated by the presence in the LR of the indicator value, optionally with different variants of the indicator value providing an indication of which other registers, if any, should also be retrieved from the stack. In example embodiments, a separate instruction is not needed or used to initiate the stack pop—it is implemented as an implied or automatic function of the processing element 12, for example in response to the presence of the indicator value.

In the secure mode 200, control passes to an instruction at a memory address indicated by the retrieved PC value and execution of the instructions 240 continues from that address.

At the end of the function call, at the branch return, the trace apparatus is configured to detect the processing element retrieving register contents from the memory storage in response to a branch return to the first security mode and to generate one or more further items of trace data relating to the retrieval of the register contents from the memory storage.

In examples, the one or more further items of trace data relating to the retrieval of the register contents from the memory storage may comprise an instruction item indicating a memory storage retrieval operation in response to a branch return to the first security mode. In examples, the one or more further items of trace data relating to the retrieval of the register contents from the memory storage comprise one or more data items, the one or more data items indicating register contents retrieved from the memory storage. In examples, the one or more data items of the further items of trace data comprise a key linking the one or more data items to the instruction item of the further items of trace data.

By way of example, the one or more data items may comprise: one or more data address items each indicative of an address from which data is retrieved from the memory storage; one or more respective data value items each indicative of data retrieved from the memory storage; and key information linking data address items to corresponding data value items.

FIG. 4 is a schematic flow chart illustrating a function call process.

At a step 400, the processing element 12 decodes an instruction initiating a function call to a different security mode. This corresponds to the decoding of the instruction 220 of FIG. 3. The instruction concerned may, for example, be a "BLXNS" instruction (branch link exchange to non-secure) which initiates a next step 410 as a part of its execution.

At the step 410, the processing element pushes the contents of one or more registers, which in at least some embodiments include the contents of the PC, to the stack 232. At a step 420, the processing element 12 writes an indicator value to the LR. At a step 430 the processing element 12 changes its security mode to the new security mode 300 and, at an optional step 440 executes the branch operation so as to commence execution of the instructions 310 under the security mode 300. (Note that the step 440 is not needed, in that there does not need to be a branch in the new security mode to commence execution).

FIG. 5 is a schematic flow chart illustrating a branch return process.

At a step 500, the processing element 12 decodes a branch return instruction such as the instruction 330 of FIG. 3.

At a step 510, the processing element 12 detects an indicator value in the LR. Note that if an indicator value was not present in the LR, the processing element 12 would simply have copied the contents of the LR to the PC and executed a conventional branch return. However, assuming that an indicator value has been detected in LR, control passes to a step 520 at which the processing element changes the security mode to the security mode 200 and, at a step 530 retrieves the one or more registers from the stack before, at a step 540, executing the branch operation so as to pass control to an instruction at a branch address represented by the PC value retrieved from the stack.

In order to implement this functionality, in example embodiments the processing element comprises:

a program counter register (an example of a register 50) indicating an address of a next instruction for execution;

a link register (an example of a register 50) configured, in response to a function call other than a function call from the first security mode to the second security mode, to store a current program counter value so that the stored value can be written back to the program counter at a branch return;

control logic (part of the functionality of the processing element 12) configured to detect that a function call is from the first security mode to the second security mode and, in response to such a detection, to store the current program counter value in the memory storage and to write an indicator value to the link register; and a detector (part of the functionality of the processing element 12) configured to detect, at a branch return operation, that the link register contains the indicator value and, in response to such a detection, to cause the processing element to retrieve the program counter value from the memory storage.

As discussed above, the indicator value may also indicate a configuration of registers to be retrieved from the stack. In such example, the control logic may be configured to store the contents of one or more further registers in the memory storage in response to a detection that a function call is from the first security mode to the second security mode; and the detector may be configured, in response to a detection that the link register contains the indicator value, to cause the processing element to retrieve the one or more further registers from the memory storage. In some examples, the control logic may be configured to a write an indicator value to the link register selected from two or more possible indicator values, each indicator value indicating the storage, in the memory storage, of a different respective set of registers; and the detector may be configured to cause the processing element to retrieve, from the memory storage, the set of registers indicated by the indicator value.

FIG. 6 is a schematic flow chart illustrating a trace item creation process as an example of a trace method.

At a step 600, the trace apparatus detects a branch return operation and, at a step 610 creates an item of trace data relating to the branch return operation. These two steps would be carried out in respect of any branch return operation.

However, in the case of a branch return from a second security mode to a first security mode, simply recording trace data relating to the branch return alone does not provide trace information relating to the retrieval of register contents which had been stored on the stack. Accordingly, to cope with this situation, further step are provided. In particular, at a step 620 the trace apparatus detects the presence of an indicator value in the LR. This detection could be made directly, in that the trace apparatus, for example through the trace circuitry 33, directly detects the presence of the indicator value in the LR. Alternatively, the trace apparatus can operate indirectly so as to detect operations of the processing element to detect the presence of the indicator value. That is to say, the trace apparatus detects the actions of the processing element 12 to carry out this detection, or detects an outcome in which the processing element 12 has detected the presence of an indicator value. In response to this detection, the trace apparatus creates one or more further trace items indicative of the retrieval of the register contents from the stack 232 and the actual register contents retrieved by that operation.

Example trace data (based on the so-called ETMv4 arrangement which uses "left hand keys" and "right hand keys" to associate data with an instruction) are as follows:

| Instruction Trace | Data trace |
| --- | --- |
| E atom (or item) for the function return instruction, right-hand key of N | Transfers have a left-hand key of N, for association with the E atom. |
| Function Return element (or item) for the return, right-hand key of N + 1 | Stack pop transfers. Transfers have a left-hand key of N + 1, for association with the function return element. |

A more specific example of a set of trace data relating to a branch return operation and the subsequent stack pop operations is as follows. This relates to a first operation (as part of the branch return) in which data including the PC are popped from the stack.

| Instruction Trace | Data trace |
| --- | --- |
| E/N$_6$ | |
| E$_7$ | $^7$DA$_B$ |
| | $^B$DV |
| FR$_8$ | $^8$DA0$_x$ |
| | $^8$DA1$_y$ |
| | $^8$DA2$_z$ |
| | $^x$DV0 |
| | $^y$DV1 |
| | $^z$DV2 |

In the table above, the nomenclature used is as follows.

"E" is a trace data item signifying an instruction which passed its condition codes test (and so was executed) "N" is a trace data item signifying an instruction which failed its condition codes test (and so was not successfully executed). A subscript value to the right hand side of an item is a "right hand key" which associates that item with another item having the same value as a left-hand superscript (a "left hand key"). "FR" signifies a function return item trace or element. "DA" signifies a data address used in a data access. "DV" signifies a data value returned from or written to that address.

The first row of the table above relates to normal trace data generated as an E/N atom when an instruction is executed. The second row corresponds to the branch return instruction, which might have loaded some data (in particular, might have loaded the indicator value from memory). This instruction does not have to load any data, but it might (depends on the instruction). The third row corresponds to the additional operations caused by needing to pop some data from the stack. This set includes the PC.

Figure 7:
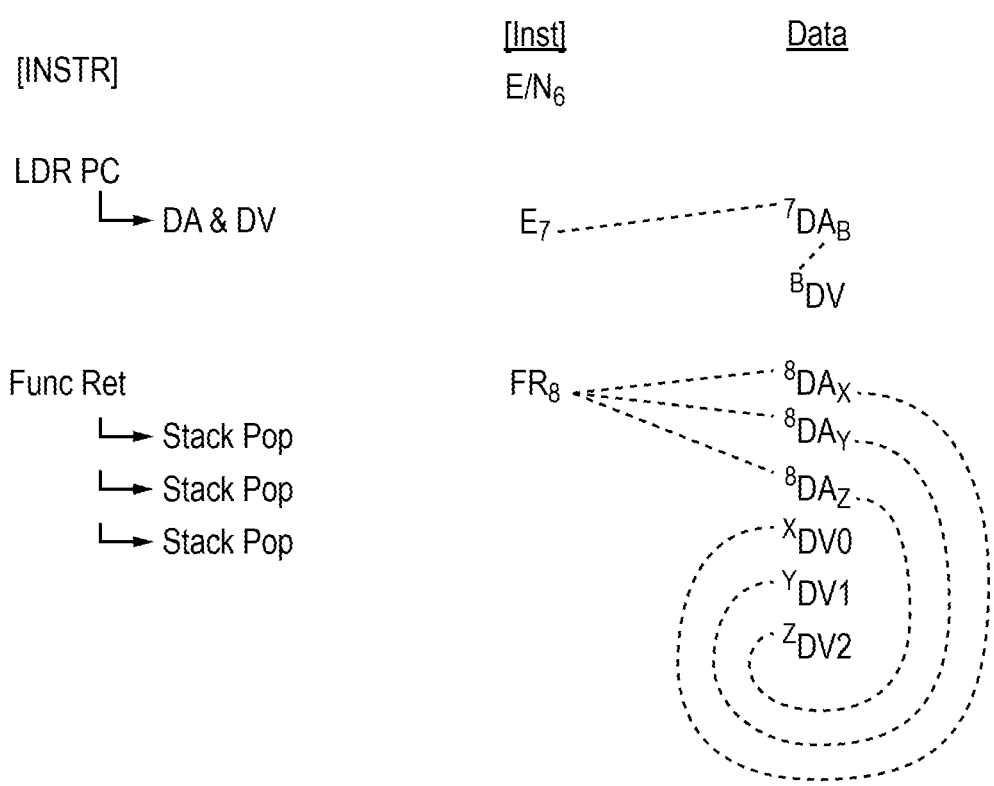
FIG. 7 schematically illustrates example trace data.

FIG. 7 provides a schematic illustration of the trace data discussed in connection with the table above.

A preceding instruction [INSTR] gives rise to the trace data E/N$_6$ relating to execution of that instruction. A LDR (load register) instruction loads the current value of the indicator value from memory. This instruction has a right hand key of 7. The value 7 is used as a left hand key of trace data $^7$DA$_B$ relating to a data address for this access. The right hand key B of that DA value is used as the left hand key of the data value trace data $^8$DV relating to the data value retrieved at that address. Assuming that this value is the indicator value, signifying a change in security mode and the need to retrieve register contents including for example the PC by a stack pop operation, the stack pop operation then takes place and a FR element is generated in the trace data (corresponding to the step 630 of FIG. 6).

The FR element FR$_8$ has a right hand key of 8, which associates it with three (in the example of FIG. 7) DA values, $^8$DA0$_x$, $^8$DA1$_y$ and $^8$DA2$_z$. These correspond to three data retrieval (stack pop) operations, each then associated (by right hand keys of x, y and z) with respective data value trace items $^x$DV0, $^y$DV1, $^z$DV2 (each left hand keyed with x, y, z respectively).

Dotted lines in FIG. 7 schematically illustrate the associations discussed above.

Accordingly, the steps shown in FIG. 6 provide an example, in the context of obtaining trace information relating to a data processing apparatus of the type discussed above, of generating items of trace data indicative of processing activities of a processing element having an associated memory storage and one or more registers, the processing element being configured to perform processing activities in two or more security modes so as to inhibit a processing activity performed in one of the security modes from accessing at least some information associated with a processing activity performed in another of the security modes, and the processing element being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

detecting a branch return operation by the processing element (for example, at the step 600);

generating one or more items of trace data relating to the branch operation (for example, at the step 610);

detecting the processing element retrieving register contents from the memory storage in response to a branch return to the first security mode (for example, at the step 620); and generating one or more further items of trace data relating to the retrieval of the register contents from the memory storage (for example, at the step 630).

FIG. 8 is a schematic flow chart illustrating a diagnostic process, for example carried out by the apparatus of FIG. 2.

At a step 700, the apparatus of FIG. 2 receives a stream of trace data, for example via the input 110, for example from a data processing apparatus of the type discussed above having a processing element having an associated memory storage and one or more registers, the processing element being configured to perform processing activities in two or more security modes so as to inhibit a processing activity performed in one of the security modes from accessing at least some information associated with a processing activity performed in another of the security modes.

At a step 710, the analysing circuitry 120 detects one or more trace items relating to a branch return operation by the processing element.

At a step 720, the analysing circuitry 120 detects one or more further trace data items relating to the retrieval of one or more register contents from the stack. This can involve, for example, detecting one or more further items of trace data indicative of the processing element retrieving register contents from the memory storage in response to a branch return from a second security mode to a first security mode.

In summary, in example embodiments, if a function or subroutine call is made from a more secure state or mode (such as a secure mode) to a less secure state or mode (such as a non-secure mode), then to protect any secure data a stack push is performed to save the relevant registers in secure memory (so non-secure data cannot access any information about the caller of the non-secure function). When returning from the function call, the return procedure pops the registers off the secure stack. The knowledge of whether this instruction will perform the stack pop is not known statically from the program image and is dependent on the current value in the LR. Therefore a debug tool won't know what data transfers will be traced for a particular instruction. Accordingly, in example embodiments, to trace the data transfers and to know they are the stack pop transfers, a new "element" is output in the instruction trace stream—the "Function Return" element. The stack pop transfers are associated with the Function Return element.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the processing element 12) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A data processing apparatus comprising:
a processing element having associated memory storage and one or more registers, the processing element being configured to perform processing activities in two or more security modes so as to inhibit a processing activity performed in one of the security modes from accessing at least some information associated with a processing activity performed in another of the security modes;
in which the processing element is configured, in response to a function call causing a branch from a processing activity in a first security mode to a processing activity in a second security mode, to store the contents of one or more of the registers in the memory storage and, in response to a branch return to the first security mode, to retrieve the register contents from the memory storage; and
trace apparatus configured to generate items of trace data indicative of processing activities of the processing element;
in which the trace apparatus is configured to detect a branch return operation by the processing element and to generate one or more items of trace data relating to the branch return operation; and
in which the trace apparatus is configured to detect the processing element retrieving register contents from the memory storage in response to a branch return to the first security mode and to generate one or more further items of trace data relating to the retrieval of the register contents from the memory storage.

2. Apparatus according to claim 1, in which the first security mode represents a higher level of security than the second security mode, such that a processing activity performed in a lower security mode cannot access at least some information associated with a processing activity performed in a higher security mode.

3. Apparatus according to claim 1, in which:
the items of trace data comprise instruction items and data items having respective keys linking an instruction item with a related data item.

4. Apparatus according to claim 3, in which the one or more further items of trace data relating to the retrieval of the register contents from the memory storage comprise an instruction item indicating a memory storage retrieval operation in response to a branch return to the first security mode.

5. Apparatus according to claim 3, in which the one or more further items of trace data relating to the retrieval of the register contents from the memory storage comprise one or more data items, the one or more data items indicating register contents retrieved from the memory storage.

6. Apparatus according to claim 5, in which the one or more data items of the further items of trace data comprise a key linking the one or more data items to the instruction item of the further items of trace data.

7. Apparatus according to claim 6, in which the one or more data items comprise:
one or more data address items each indicative of an address from which data is retrieved from the memory storage;
one or more respective data value items each indicative of data retrieved from the memory storage; and
key information linking data address items to corresponding data value items.

8. Apparatus according to claim 1, in which the processing element comprises:
a program counter register indicating an address of a next instruction for execution;
a link register configured, in response to a function call other than a function call from the first security mode to the second security mode, to store a current program counter value so that the stored value can be written back to the program counter at a branch return;
control logic configured to detect that a function call is from the first security mode to the second security mode and, in response to such a detection, to store the current program counter value in the memory storage and to write an indicator value to the link register; and
a detector configured to detect, at a branch return operation, that the link register contains the indicator value and, in response to such a detection, to cause the processing element to retrieve the program counter value from the memory storage.

9. Apparatus according to claim 8, in which:

the control logic is configured to store the contents of one or more further registers in the memory storage in response to a detection that a function call is from the first security mode to the second security mode; and the detector is configured, in response to a detection that the link register contains the indicator value, to cause the processing element to retrieve the one or more further registers from the memory storage.

10. Apparatus according to claim 9, in which:

the control logic is configured to a write an indicator value to the link register selected from two or more possible indicator values, each indicator value indicating the storage, in the memory storage, of a different respective set of registers; and the detector is configured to cause the processing element to retrieve, from the memory storage, the set of registers indicated by the indicator value.

11. Apparatus according to claim 1, in which:

the processing element is a central processing unit (CPU); and the memory storage is a CPU stack.

12. A trace apparatus comprising:

trace circuitry configured to generate items of trace data indicative of processing activities of a processing element having an associated memory storage and one or more registers, the processing element being configured to perform processing activities in two or more security modes so as to inhibit a processing activity performed in one of the security modes from accessing at least some information associated with a processing activity performed in another of the security modes, and the processing element being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

in which the trace circuitry is configured to detect a branch return operation by the processing element and to generate one or more items of trace data relating to the branch operation; and in which the trace circuitry is configured to detect the processing element retrieving register contents from the memory storage in response to a branch return to the first security mode and to generate one or more further items of trace data relating to the retrieval of the register contents from the memory storage.

13. A trace method comprising:

generating items of trace data indicative of processing activities of a processing element having an associated memory storage and one or more registers, the processing element being configured to perform processing activities in two or more security modes so as to inhibit a processing activity performed in one of the security modes from accessing at least some information associated with a processing activity performed in another of the security modes, and the processing element being configured, in response to a function call causing a branch from a processing activity in a first security mode to a processing activity in a second security mode, to store the contents of one or more of the registers in the memory storage and, in response to a branch return to the first security mode, to retrieve the register contents from the memory storage;

detecting a branch return operation by the processing element;

generating one or more items of trace data relating to the branch operation;

detecting the processing element retrieving register contents from the memory storage in response to a branch return to the first security mode; and generating one or more further items of trace data relating to the retrieval of the register contents from the memory storage.

* * * * *